(12) United States Patent
Miyazaki et al.

(10) Patent No.: US 10,964,041 B2
(45) Date of Patent: Mar. 30, 2021

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Shinichi Miyazaki, Kawasaki (JP); Maya Yazawa, Kawasaki (JP); Hidetsugu Kagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 16/449,819

(22) Filed: Jun. 24, 2019

(65) Prior Publication Data

US 2020/0013178 A1 Jan. 9, 2020

(30) Foreign Application Priority Data

Jul. 5, 2018 (JP) .............................. JP2018-128569

(51) Int. Cl.
*G06T 7/571* (2017.01)
*G06T 7/529* (2017.01)

(52) U.S. Cl.
CPC .............. *G06T 7/571* (2017.01); *G06T 7/529* (2017.01); *G06T 2207/10028* (2013.01)

(58) Field of Classification Search
CPC ................................ G06T 7/571; G06T 7/529; G06T 2207/10028
See application file for complete search history.

(56) References Cited

U.S. PATENT DOCUMENTS

| | | | | |
|---|---|---|---|---|
| 4,470,676 A | * | 9/1984 | Kinoshita | G02B 27/40 250/201.7 |
| 9,292,926 B1 | * | 3/2016 | Tang | H04N 5/23206 |
| 9,324,153 B2 | | 4/2016 | Komatsu | |
| 2006/0098861 A1 | * | 5/2006 | See | G06T 7/32 382/145 |
| 2013/0300860 A1 | | 11/2013 | Komatsu | |
| 2015/0016679 A1 | * | 1/2015 | Cao | G06K 9/4604 382/103 |
| 2015/0092992 A1 | * | 4/2015 | Ishihara | G06K 9/4652 382/106 |

(Continued)

FOREIGN PATENT DOCUMENTS

| | | |
|---|---|---|
| JP | 2008-015754 A | 1/2008 |
| JP | 2009-251839 A | 10/2009 |
| JP | 2013-253964 A | 12/2013 |

*Primary Examiner* — Utpal D Shah
(74) *Attorney, Agent, or Firm* — Venable LLP

(57) ABSTRACT

An image processing apparatus comprises: an obtaining unit configured to obtain an image and distance information concerning a distance from an in-focus plane, which corresponds to each pixel included in the image; a setting unit configured to set an image processing condition according to the distance information based on an output characteristic of an output apparatus concerning a sharpness; and a processing unit configured to perform image processing for the image using the distance information obtained by the obtaining unit and the image processing condition set by the setting unit, wherein the processing unit changes, in accordance with the distance information, a band of a spatial frequency of the image to which the image processing is applied.

16 Claims, 9 Drawing Sheets

(56) References Cited

U.S. PATENT DOCUMENTS

| | | | | |
|---|---|---|---|---|
| 2015/0296122 A1* | 10/2015 | Kelley | ............... | H04N 5/23212 |
| | | | | 348/349 |
| 2015/0316833 A1* | 11/2015 | Watanabe | ........ | H04N 5/232122 |
| | | | | 348/345 |
| 2016/0042522 A1* | 2/2016 | Wajs | ....................... | H04N 5/332 |
| | | | | 348/335 |
| 2016/0057341 A1* | 2/2016 | Nakayama | ......... | H04N 5/23229 |
| | | | | 348/207.1 |
| 2016/0065924 A1* | 3/2016 | Yokoyama | .............. | G06T 5/003 |
| | | | | 348/241 |
| 2016/0119606 A1* | 4/2016 | Horikawa | ............ | H04N 13/207 |
| | | | | 348/46 |
| 2016/0127637 A1* | 5/2016 | Takao | ............... | H04N 5/232122 |
| | | | | 348/208.12 |
| 2016/0239977 A1* | 8/2016 | Komatsu | .................. | G06T 7/174 |
| 2016/0309142 A1* | 10/2016 | Kiyosawa | ............ | H04N 13/111 |
| 2016/0316122 A1* | 10/2016 | Watanabe | ............ | H04N 5/2328 |
| 2017/0272704 A1* | 9/2017 | Kato | ..................... | H04N 5/2256 |
| 2019/0253609 A1 | 8/2019 | Miyazaki et al. | | |
| 2019/0253689 A1 | 8/2019 | Yanai et al. | | |
| 2019/0253690 A1 | 8/2019 | Yanai et al. | | |
| 2020/0311856 A1* | 10/2020 | Inoue | .................... | G06T 1/0064 |

* cited by examiner

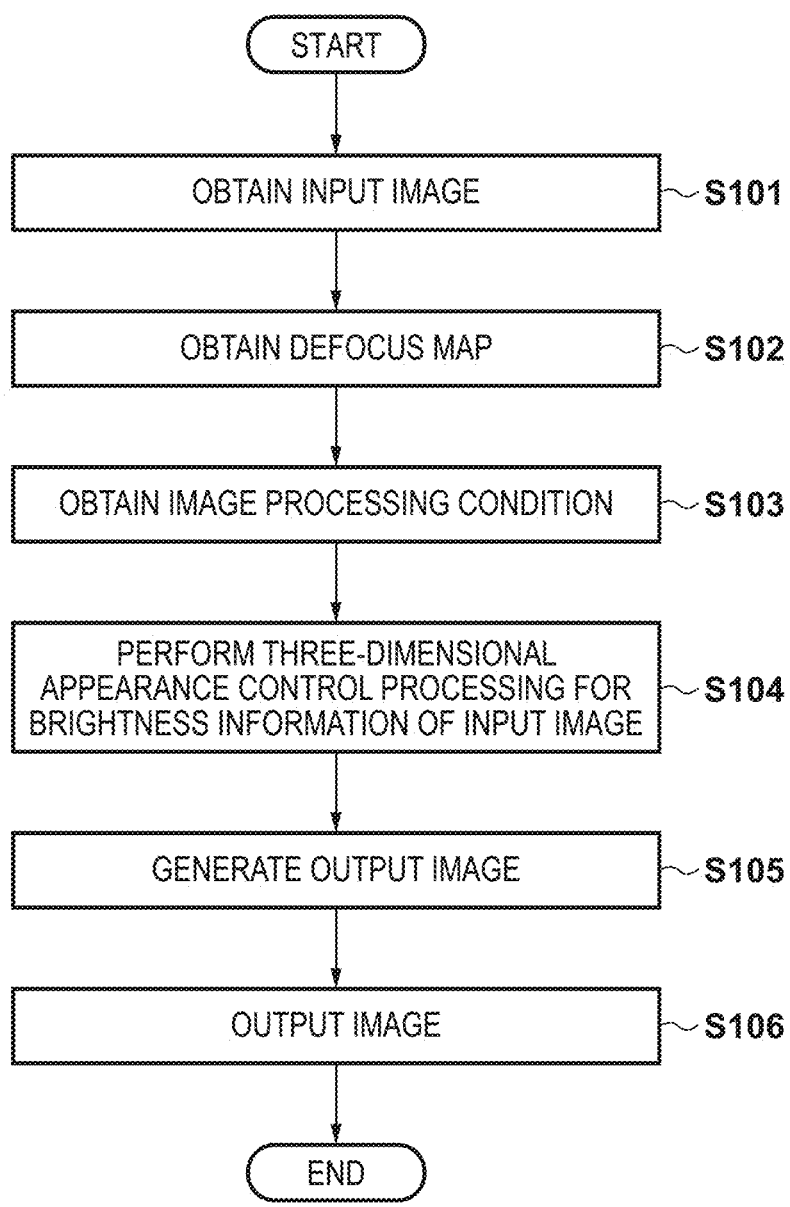

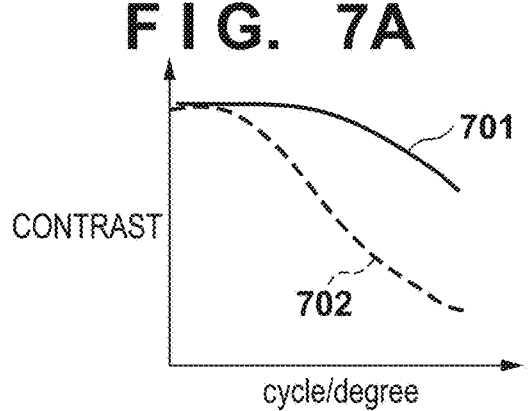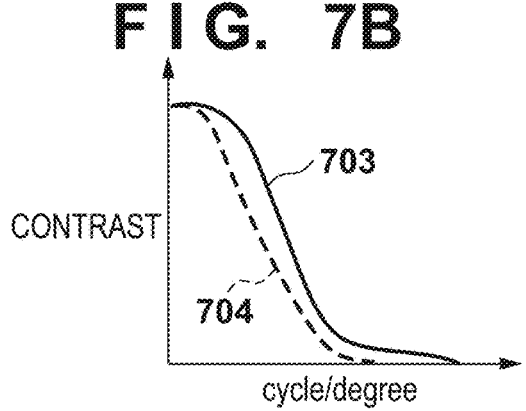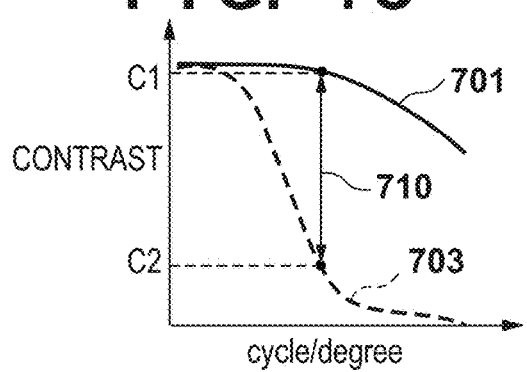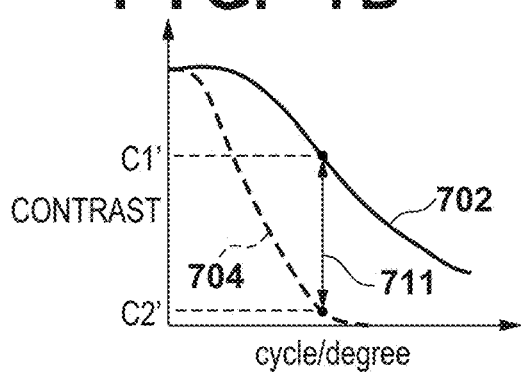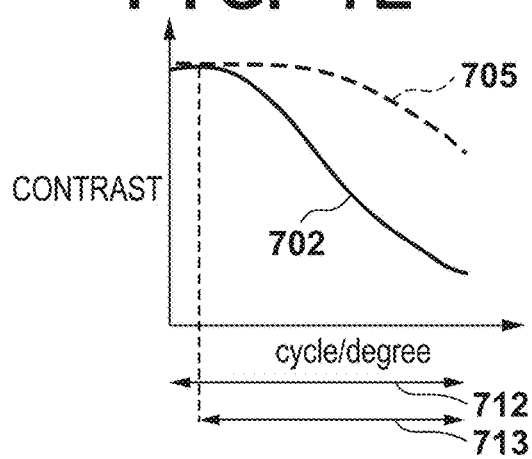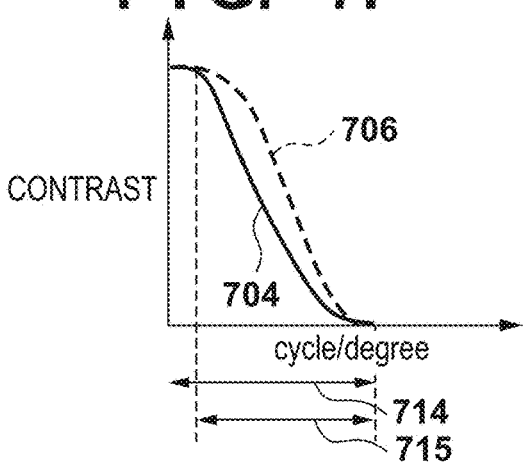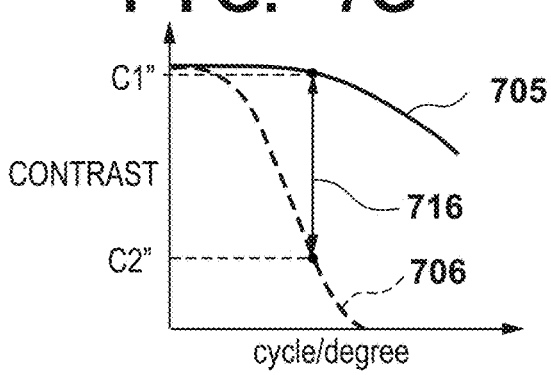

THREE-DIMENSIONAL APPEARANCE CONTROL AMOUNT

THREE-DIMENSIONAL APPEARANCE CONTROL AMOUNT

THREE-DIMENSIONAL APPEARANCE CONTROL AMOUNT

THREE-DIMENSIONAL APPEARANCE CONTROL AMOUNT

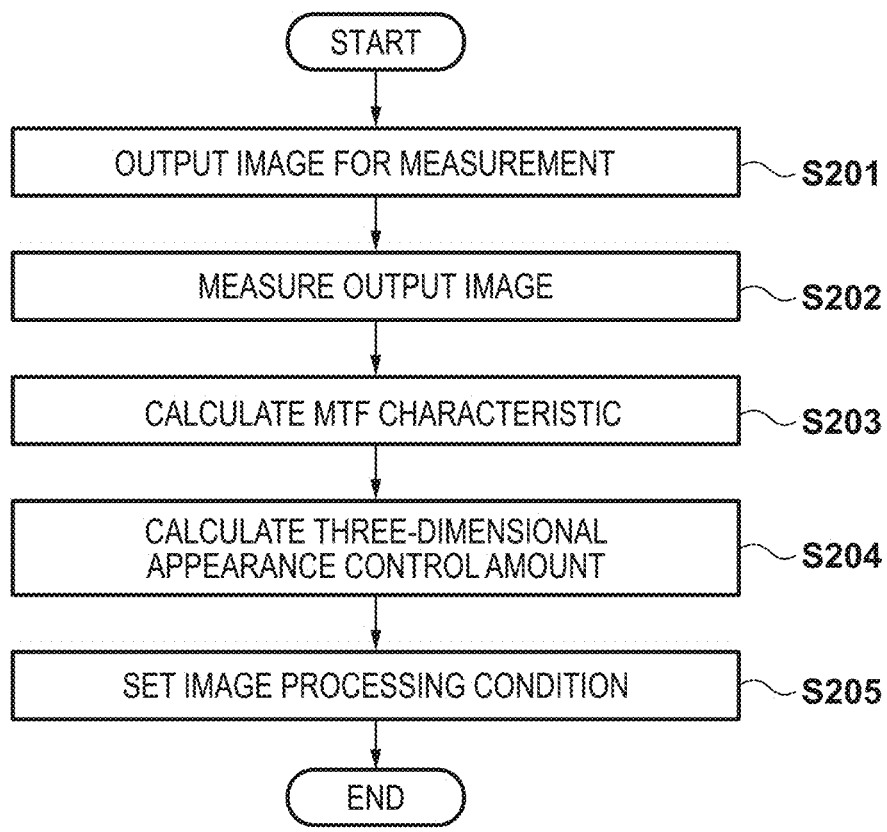
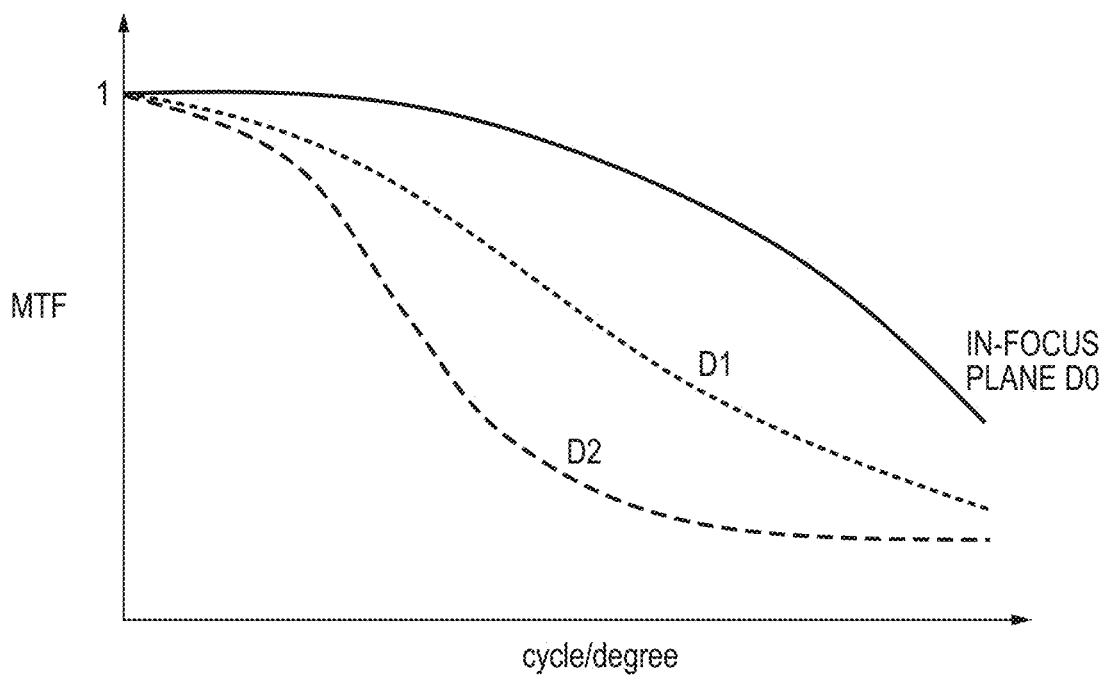

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

Humans perceive something seen by the eyes as three-dimensional. This is thought to be the brain perceiving based on clues from both eyes, clues from a single eye, motion parallax, or the like. Clues from both eyes include, for example, retinal parallax which is a difference between retinal images for both eyes. Furthermore, a clue from a single eye may be a line perspective, the size of an object, a texture gradient, atmosphere distance, a defocused state effect, or the like. By using at least one of these clues, a human perceives a three-dimensional appearance, in other words, the depth or thickness of an "object", and an in front/behind relationship for the "object".

When a person views a displayed, projected or printed two-dimensional image that was captured by an image capturing apparatus, a three-dimensional appearance of the image is recognized from a difference between a portion in focus, and a portion that is in a defocused state in accordance with depth. In other words, reproduction of the portion of the image that is in focus and the portion that is not in focus (is in a defocused state) is important for a three-dimensional appearance.

On the other hand, methods of obtaining the distance information of a scene including an object generally at the time of image capturing, such as a method of measuring the actual distance from an image capturing point to a target by, for example, a laser range finder or the like and a method of measuring a distance from pieces of parallax information of two cameras, have also been proposed. An example of a high-quality image forming method using depth information is a technique described in Japanese Patent Laid-Open No. 2009-251839.

As described above, since the three-dimensional appearance in a two-dimensional still image greatly depends on the blur effect, that is, the sharpness of the image, an image with a three-dimensional appearance cannot be provided unless appropriate control of the sharpness of the output image. Additionally, in the sharpness control, a high-quality image with a three-dimensional appearance cannot be output unless correction considering the human visual characteristic is performed, and an image quality degradation factor such as noise upon image capturing is suppressed as much as possible.

However, since depth information used in Japanese Patent Laid-Open No. 2009-251839 is information estimated and calculated from an image itself, it is sometimes impossible to correctly obtain the depth depending on the characteristic or composition of the image. Additionally, in Japanese Patent Laid-Open No. 2009-251839, image processing considering an image quality degradation factor is not performed. As a result, since processing suitable for a target image cannot be performed, a sense of discomfort may occur in the three-dimensional appearance of the image, or the image quality degradation factor may be enhanced.

SUMMARY OF THE INVENTION

The present invention has been made in consideration of the above-described problem, and enables an expression of a three-dimensional appearance in an image and output of a high-quality image.

According to one aspect of the present invention, there is provided an image processing apparatus comprising: an obtaining unit configured to obtain an image and distance information concerning a distance from an in-focus plane, which corresponds to each pixel included in the image; a setting unit configured to set an image processing condition according to the distance information based on an output characteristic of an output apparatus concerning a sharpness; and a processing unit configured to perform image processing for the image using the distance information obtained by the obtaining unit and the image processing condition set by the setting unit, wherein the processing unit changes, in accordance with the distance information, a band of a spatial frequency of the image to which the image processing is applied.

According to another aspect of the present invention, there is provided an image processing apparatus comprising: an obtaining unit configured to obtain an image and distance information concerning a distance from an in-focus plane, which corresponds to each pixel included in the image; a setting unit configured to set an image processing condition according to the distance information based on an output characteristic of an output apparatus concerning a sharpness; and a processing unit configured to perform image processing for the image using the distance information obtained by the obtaining unit and the image processing condition set by the setting unit, wherein in a case in which the distance information indicates a value larger than a predetermined value, the processing unit does not apply the image processing to a band higher than a first frequency of the image and in a case in which the distance information indicates a value not larger than the predetermined value, the processing unit applies the image processing to a band higher than the first frequency of the image.

According to another aspect of the present invention, there is provided an image processing method comprising: obtaining an image and distance information concerning a distance from an in-focus plane, which corresponds to each pixel included in the image; setting an image processing condition according to the distance information based on an output characteristic of an output apparatus concerning a sharpness; and performing image processing for the image using the obtained distance information and the set image processing condition, wherein in the image processing, a band of a spatial frequency of the image to which the image processing is applied is changed in accordance with the distance information.

According to another aspect of the present invention, there is provided an image processing method comprising: obtaining an image and distance information concerning a distance from an in-focus plane, which corresponds to each pixel included in the image; setting an image processing condition according to the distance information based on an output characteristic of an output apparatus concerning a sharpness; and performing image processing for the image using the obtained distance information and the set image processing condition, wherein in the image processing, in a case in which the distance information indicates a value larger than a predetermined value, the image processing is not applied to a band higher than a first frequency of the image and in a case in which the distance information indicates a value not larger than the predetermined value, the image processing is applied to a band higher than the first frequency of the image.

According to another aspect of the present invention, there is provided a non-transitory computer-readable storage medium storing a program configured to cause a computer to execute: obtaining an image and distance information concerning a distance from an in-focus plane, which corresponds to each pixel included in the image; setting an image processing condition according to the distance information based on an output characteristic of an output apparatus concerning a sharpness; and performing image processing for the image using the obtained distance information and the set image processing condition, wherein in the image processing, a band of a spatial frequency of the image to which the image processing is applied is changed in accordance with the distance information.

According to another aspect of the present invention, there is provided a non-transitory computer-readable storage medium storing a program configured to cause a computer to execute: obtaining an image and distance information concerning a distance from an in-focus plane, which corresponds to each pixel included in the image; setting an image processing condition according to the distance information based on an output characteristic of an output apparatus concerning a sharpness; and performing image processing for the image using the obtained distance information and the set image processing condition, wherein in the image processing, in a case in which the distance information indicates a value larger than a predetermined value, the image processing is not applied to a band higher than a first frequency of the image and in a case in which the distance information indicates a value not larger than the predetermined value, the image processing is applied to a band higher than the first frequency of the image.

According to the present invention, it is possible to express a three-dimensional appearance in an image and output a high-quality image.

Further features of the present invention will become apparent from the following description of exemplary embodiments (with reference to the attached drawings).

BRIEF DESCRIPTION OF THE DRAWINGS

FIG. 6 is a flowchart of image processing according to the present invention;

FIGS. 7A to 7G are views for explaining the relationship between a contrast and a spatial frequency according to the present invention;

FIG. 11 is a flowchart of image processing condition generation processing according to the present invention; and FIG. 12 is a view for explaining the frequency characteristic of an image according to the present invention.

DESCRIPTION OF THE EMBODIMENTS

Preferred embodiments of the present invention will now be described in detail with reference to the accompanying drawings. Note that the constituent elements described in the embodiments are merely examples, and the scope of the present invention is not limited by these.

In an embodiment to be described below, image processing according to the present invention will be described using an inkjet printer as an example of an output apparatus. Additionally, in the following explanation, control concerning reproduction of a three-dimensional appearance when forming a two-dimensional image will be referred to as three-dimensional appearance control.

[System Arrangement]

Figure 1:
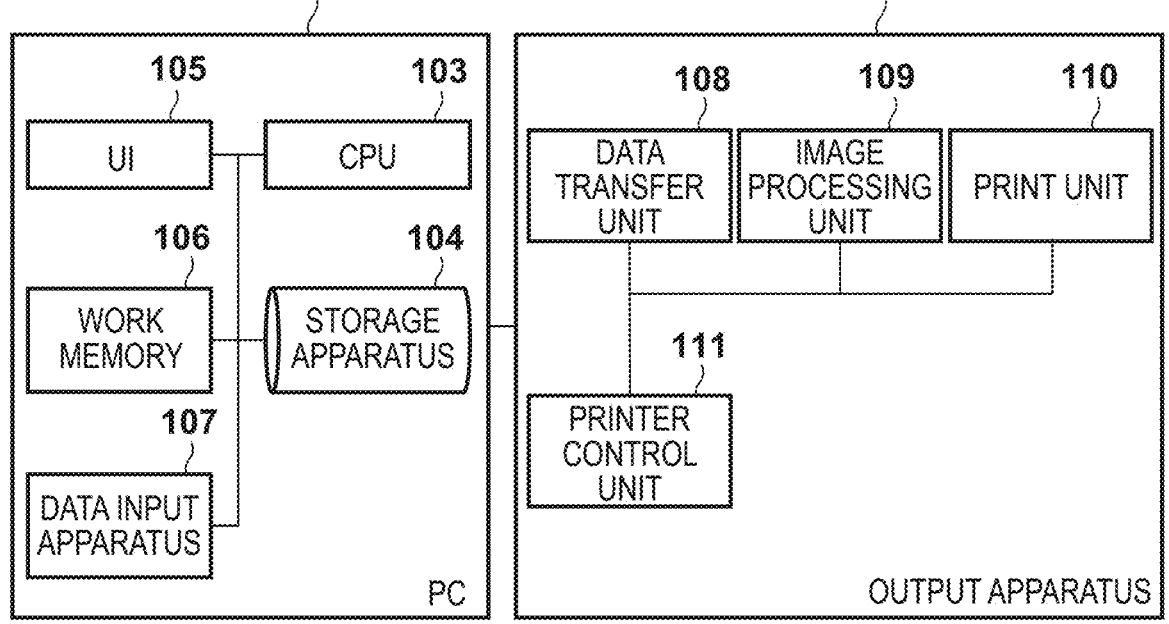
FIG. 1 is a block diagram showing an example of the arrangement of an image processing system according to the present invention.

FIG. 1 shows an example of the overall arrangement of a print system to which an image processing apparatus according to an embodiment of the present invention is applied. The print system includes an information processing apparatus (to be also referred to as a "PC" hereinafter) 101, and an output apparatus 102. The PC 101 and the output apparatus 102 are communicably connected by an interface such as a network, a USB (Universal Serial Bus), or a local bus. The connection method here is not particularly limited, and may be wired/wireless. The PC 101 executes transfer of a print control instruction, necessary information, and data to the output apparatus 102. Hence, each of the PC 101 and the output apparatus 102 includes a communication unit to an external device, although not illustrated in FIG. 1.

The PC 101 includes a CPU 103, a storage apparatus 104, a UI 105, a work memory 106, and a data input apparatus 107. The storage apparatus 104 is a nonvolatile storage area, and stores an OS (Operating System), a system program according to this embodiment, various kinds of application software, and parameter data necessary for various kinds of processing. The storage apparatus 104 can be constituted by a means represented by an HDD or a flash ROM. The CPU 103 executes processing using the work memory 106 when executing various kinds of software stored in the storage apparatus 104. The UI 105 is an operation unit serving as a user interface, and includes an input device such as a keyboard or a mouse, and a display device such as a display concerning execution of various kinds of processing. The work memory 106 is a volatile storage area, and is used when, for example, the CPU 103 executes various kinds of processing. The data input apparatus 107 performs data input/output for an external recording medium such as an SD card. In addition, the PC 101 may directly transfer data without the intervention of an external recording medium by connecting an image capturing apparatus (not shown) such as a camera to the data input apparatus 107.

The output apparatus 102 includes a data transfer unit 108, an image processing unit 109, a print unit 110, and a printer control unit 111. As described above, in this embodiment, the output apparatus 102 will be described assuming that it is a printer capable of executing a printing operation by an inkjet method. However, the output apparatus 102 may be an MFP (Multi-Function Peripheral) having another function. Print data used for print processing is transmitted at an appropriate timing from the PC 101 to the output apparatus 102.

The print data according to this embodiment includes input image data, information corresponding to the distance from an in-focus plane at the time of image capturing corresponding to the input image data, image processing parameters and printer control data that are unique data of a printing medium, and print information data. The input image data corresponds to an image captured by an image capturing apparatus such as a camera. The print information data corresponds to the information of print quality, a printing medium, and the like selected on a UI by the user.

The printing medium is a medium to perform image formation in the output apparatus 102, and indicates, for example, a paper medium or the like. The information (to be also referred to as "distance information" hereinafter) corresponding to the distance from an in-focus plane at the time of image capturing corresponds to the information of a defocus amount (defocus information), an image shift amount, a distance from an in-focus plane to an object, and the like. The input image data or the distance information may be generated in the image capturing apparatus (not shown), or may be generated in the PC 101 or the output apparatus 102 connected to the image capturing apparatus (not shown). Alternatively, information used to generate the distance information may be obtained from the image capturing apparatus (not shown), and the distance information may be generated in the PC 101 or the output apparatus 102 connected to the image capturing apparatus. Here, the information used to generate the distance information is, for example, a pair of images obtained by photoelectrically converting light beams that have passed through different areas of the exit pupil of an imaging lens provided in the image capturing apparatus.

The data transfer unit 108 extracts the input image data, the distance information, and the image processing parameters from the print data sent from the PC 101, and sends them to the image processing unit 109. The data transfer unit 108 sends the printer control data to the printer control unit 111. In this embodiment, the input image data is magnified, by resolution conversion processing stored as a program in the storage apparatus 104 of the PC 101, to the size of the printing medium set by the user and then used. The resolution conversion processing may similarly be performed in the image processing unit 109 of the output apparatus 102. Additionally, in this embodiment, the image processing unit 109 exists in the output apparatus 102. However, the processing may be performed in the PC 101.

The image processing parameters and the printer control data are stored in the storage apparatus 104 of the PC 101 or in a storage device (not shown) of the output apparatus 102. These may be selected based on the print information data in the print data and sent to the image processing unit 109 or the printer control unit 111. The printer control unit 111 controls the operation of the print unit 110 in accordance with the printer control data. In this example, concerning printing in the print unit 110, printing is performed by an inkjet printing method.

Figure 2:
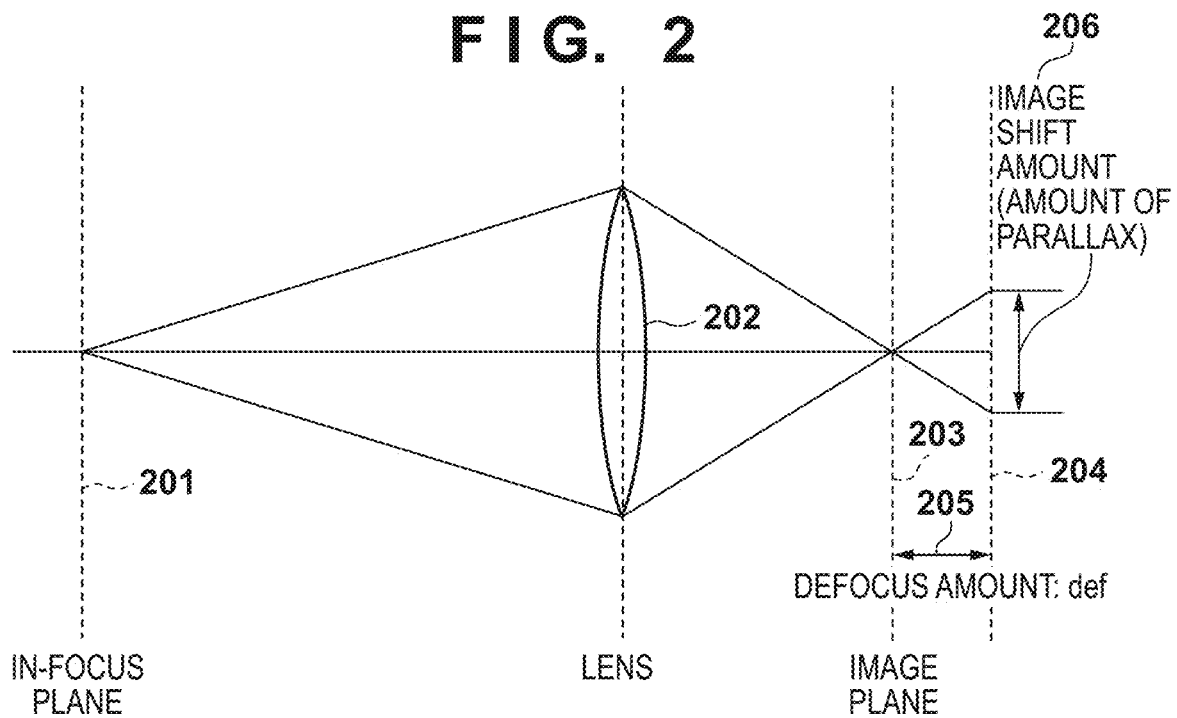
FIG. 2 is a view showing the relationship between an in-focus plane, an image shift amount, and a defocus amount.

FIG. 2 is a view for explaining the relationship between an in-focus plane, an image shift amount, and a defocus amount at the time of image capturing according to this embodiment. Referring to FIG. 2, an in-focus plane 201 is a plane that is parallel to an image plane (imaging plane) 203 and is in focus in the image capturing apparatus (not shown). In addition, a defocus amount 205 (def) is the difference between the image plane 203 and an imaging plane position 204 in defocus (the difference between an expected imaging plane and an actual imaging plane), and is proportional to a blur amount. In this example, the expected imaging plane corresponds to the image plane 203, and the actual imaging plane corresponds to the imaging plane position 204. As a method of detecting the defocus amount 205, conventionally, a pupil division phase difference detection method or a method of detecting a defocus amount using a plurality of images of different blurs is known.

For example, Japanese Patent Laid-Open No. 2008-15754 discloses a method of calculating the defocus amount 205 from an image shift amount (parallax amount) 206 of the image shown in FIG. 2. In this method, for a pair of pixel data obtained by photoelectrically converting light beams that have passed through different areas of the exit pupil of an imaging lens, correlation values are calculated while relatively shifting the data, and the image shift amount 206 of the highest correlation is obtained as the parallax amount. Furthermore, for the calculated image shift amount 206, the defocus amount 205 of the object image plane with respect to the expected imaging plane is calculated using a conversion coefficient decided in accordance with the lens and the pixel pitch of the imaging element.

Also, Japanese Patent Laid-Open No. 2013-253964 discloses a method of calculating a defocus amount by a DFD (Depth From Defocus) method. In the DFD method, a plurality of images of different blur amounts are obtained by controlling the image capturing parameters of an image capturing optical system. In the plurality of obtained images, the correlation amount of each other's blurs is calculated using a measurement target pixel and pixels around it, thereby calculating defocus amount 205.

Figure 3:
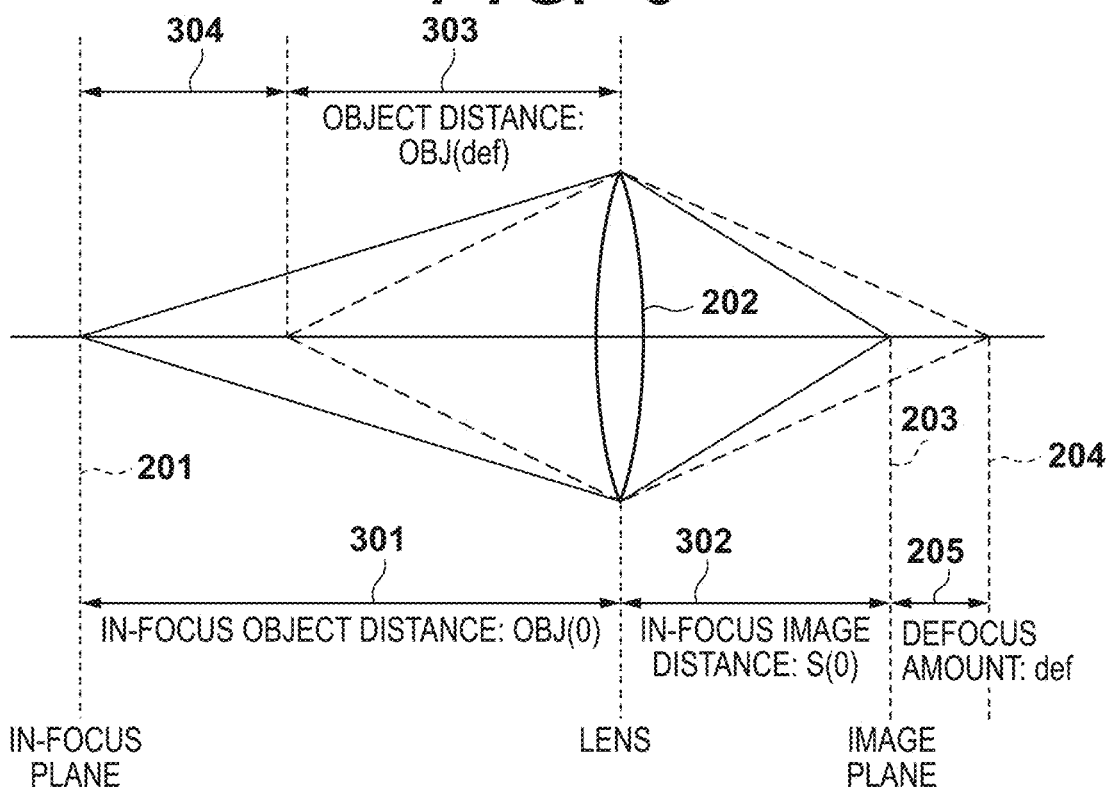
FIG. 3 is a view showing the relationship between an in-focus image distance, an object distance, and an in-focus object distance.

A method of calculating the distance between an in-focus plane 201 and an object will be described next with reference to FIG. 3. Referring to FIG. 3, reference numeral 301 denotes an in-focus object distance OBJ(0), which is the distance from the in-focus plane 201 to a lens 202. Reference numeral 302 denotes an in-focus image plane distance S(0) to the in-focus image object, which is the distance from the lens 202 to the image plane 203 (expected imaging plane). Reference numeral 303 denotes an object distance OBJ(def), which is the distance from the lens 202 to an object (not shown). Reference numeral 304 denotes a distance from the in-focus plane 201 to the object (not shown). A variable def represents the defocus amount 205. A case in which variable def=0 means that the difference between the image plane 203 and the imaging plane position 204 in defocus is 0. Since $$\frac{1}{OBJ(0)} + \frac{1}{S(0)} = \frac{1}{f} \quad (1)$$

$$\frac{1}{OBJ(def)} + \frac{1}{S(0)+def} = \frac{1}{f} \quad (2)$$

hold by the lens formula, the object distance OBJ(def) can be calculated by $$\frac{1}{OBJ(def)} + \frac{(S(0)+def)*f}{(S(0)-def)*f} \qquad (3)$$

When the object distance OBJ(def) calculated by equation (3) is subtracted from the in-focus object distance OBJ(0), the distance 304 from the in-focus plane 201 to the object (not shown) can be calculated.

The above-described information (distance information) corresponding to the distance from the in-focus plane 201 is information proportional to the distance from the in-focus plane 201. For this reason, as the information (distance information) corresponding to the distance from the in-focus plane 201, any of the image shift amount 206, the defocus amount 205, and the distance 304 from the in-focus plane 201 to the object (not shown) described above can be used.

A defocus map will be described next. A defocus map is formed by mapping the above-described defocus amount 205 to a plurality of points on the input image data, and holds the information of a defocus amount corresponding to each pixel of the input image data. Hence, the number of pieces of held information of defocus amounts changes in accordance with the number of pixels of input image data.

Figure 5A:
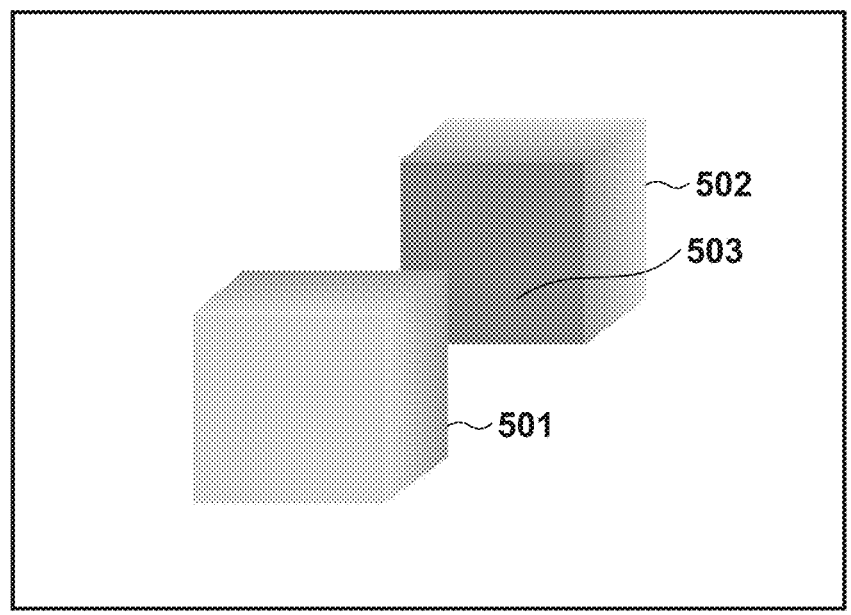
FIGS. 5A and 5B are views for explaining a defocus map and areas.

FIG. 5A is a view for explaining the defocus map according to this embodiment. A description will be made here using an example of a defocus map for input image data obtained by capturing two cubes 501 and 502, as shown in FIG. 5A. The information of a defocus amount for each pixel of the input image data is held. In the image shown in FIG. 5A, focus is placed at a position 503. The longer the distance from the position is (the longer the distance in the depth direction is), the more the defocus amount increases.

Figure 5B:
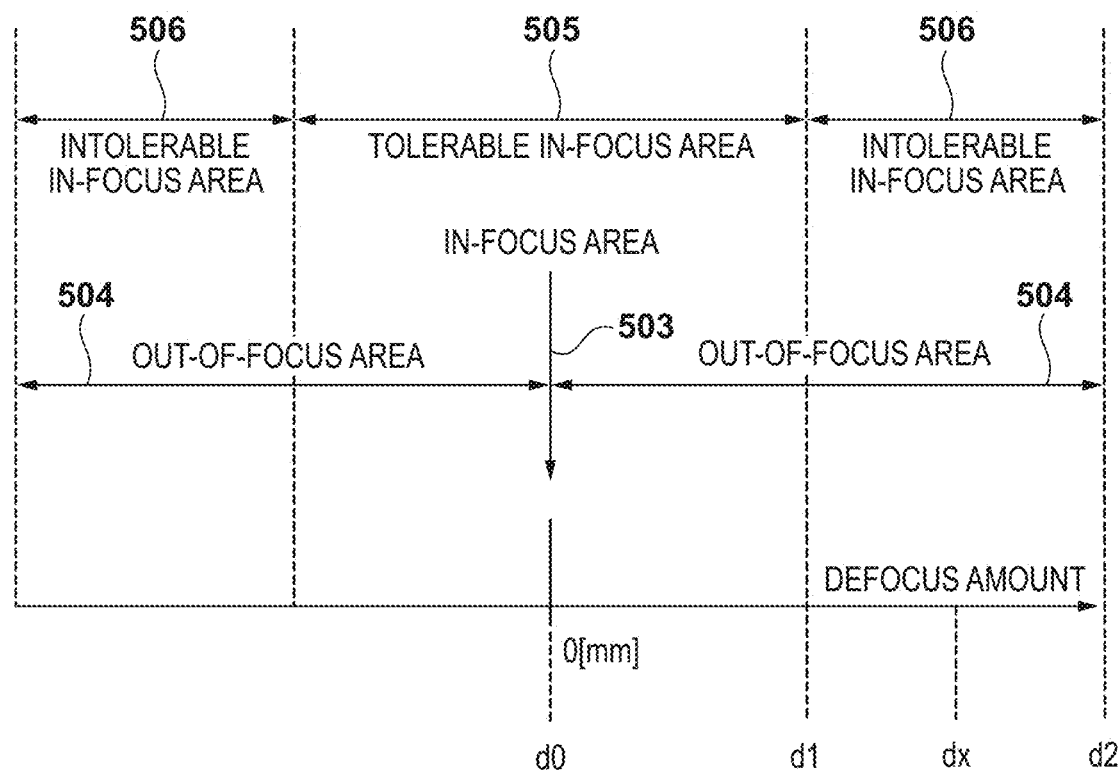

FIG. 5B is a view for explaining the defocus amount and areas used in this embodiment. In FIG. 5B, the abscissa represents the defocus amount [mm]. The value at the center is 0, and the defocus amount increases toward the left and right sides. Defocus amount="0" in FIG. 5B is the defocus amount corresponding to the in-focus plane 201 at the time of image capturing, which corresponds to the darkest portion (in-focus area 503) in FIG. 5A. As the value of the defocus amount separates from "0", the area becomes brighter in FIG. 5A. In the defocus map shown in FIG. 5A, the in-focus area 503 is an in-focus plane image area that is in focus. This corresponds to the in-focus area 503 shown in FIG. 5B as well. Areas other than the in-focus area 503 are defined, in this embodiment, as out-of-focus areas 504 as areas that do not correspond to the in-focus area 503 on the defocus map. In addition, an area that is allowed to be in focus is defined as a tolerable in-focus area 505. As the tolerable in-focus area 505, a range may be defined as a depth of field, or an area may arbitrarily be defined by subject experiments. Areas other than the tolerable in-focus area 505 are defined as intolerable in-focus areas 506 in this embodiment. In FIG. 5B, the defocus amount is plotted along the abscissa. However, the present invention is not limited to this. For example, another information such as the image shift amount 206 or the distance 304 from the in-focus plane 201 to the object described above as an example of distance information may be used.

First Embodiment

Figure 4:
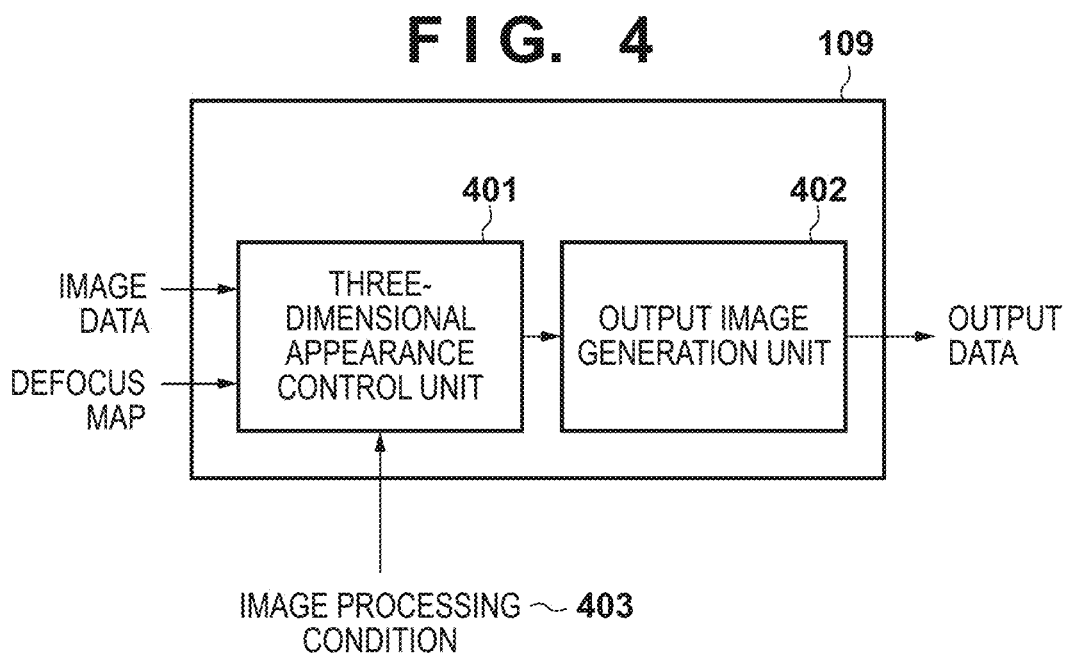
FIG. 4 is a block diagram showing an example of a software configuration according to an embodiment of the present invention.

FIG. 4 shows an example of the arrangement of an image processing unit 109 according to the first embodiment of the present invention. The image processing unit 109 may be executed by, for example, a dedicated circuit or the like. Alternatively, a CPU or a storage area may be provided, and the CPU may read out and execute a program stored in the storage area to implement the image processing unit 109. Note that in this embodiment, the image processing unit 109 is provided in an output apparatus 102. However, the present invention is not limited to this. For example, a function corresponding to the image processing unit 109 may be provided by a PC 101 or an image capturing apparatus (not shown), and these may cooperate with the output apparatus 102 or obtain the information of the output apparatus 102 to execute the function.

The image processing unit 109 includes a three-dimensional appearance control unit 401 and an output image generation unit 402. Image data, a defocus map (distance information), and an image processing condition 403 are input to the three-dimensional appearance control unit 401. The output image generation unit 402 receives the image data processed by the three-dimensional appearance control unit 401, and outputs image data to be used by a print unit 110 as output data. Details of the processing of each processing unit will be described with reference to a flowchart.

Image processing by the image processing unit 109 according to this embodiment will be described with reference to the flowchart of FIG. 6.

In step S101, the image processing unit 109 obtains input image data.

In step S102, the image processing unit 109 obtains the above-described defocus map as distance information.

In step S103, the three-dimensional appearance control unit 401 obtains the image processing condition 403 that is determined based on the output characteristic of the output apparatus 102 and stored in a storage apparatus 104 or a storage device (a hard disk or a ROM (not shown)) in the output apparatus 102. In this embodiment, the image processing condition 403 is defined for each print condition in correspondence with the output characteristic of the output apparatus 102 and held in the storage device (not shown). The three-dimensional appearance control unit 401 selects and obtains the image processing condition 403 in accordance with the above-described print information data.

In step S104, the three-dimensional appearance control unit 401 performs three-dimensional appearance control processing for the brightness information of the input image. The three-dimensional appearance of the image is controlled based on the characteristic of the sharpness of the input image data, the defocus map, and the image processing condition 403 determined based on the output characteristic of the output apparatus, though details of this processing will be described later. Note that details of the image processing condition 403 will be described later. In addition, as the above-described characteristic of the sharpness of the input image data, information obtained from the image capturing apparatus such as a camera may be used. A description will be made assuming that this information is obtained together with the input image data.

In step S105, for the output image data (RGB) output from the three-dimensional appearance control unit 401, the output image generation unit 402 generates output data to be printed by the print unit 110. As described above, in this embodiment, since an inkjet printer is used as the output apparatus 102, output data used in printing by an inkjet printhead (not shown) is generated in this case. As detailed processing of output image generation, first, color conversion processing of converting device-independent RGB data in the target output image data into device-dependent RGB data is performed. Next, ink color separation processing of converting the device-dependent RGB data into ink color data and tone correction processing of performing tone correction such that the tones are linearly associated with the tone characteristic of the printing apparatus are performed. Furthermore, halftone processing of converting the ink color data into information of ON/OFF of ink dots, mask data conversion processing of generating binary data to be printed by each print scan of the printhead (not shown), and the like are performed. All the processes are general processes in the inkjet printer and are not associated with the basis of this embodiment, and a detailed description thereof will be omitted here.

In step S106, the output image generation unit 402 outputs the created output data to the print unit 110. The output data is output (printed) on a printing medium by the print unit 110. This processing procedure thus ends.

[Three-Dimensional Appearance in Output Apparatus]

Control of the output characteristic of the output apparatus 102 and the three-dimensional appearance, which influence the sharpness, will be described. As described above, when viewing a two-dimensional image captured by an image capturing apparatus such as a camera, a human recognizes the depth and the three-dimensional appearance of the image based on the difference of sharpness between a tolerable in-focus area including an in-focus area that is in focus and an intolerable in-focus area that is not in focus (blurs).

On the other hand, when the image is output via the output apparatus such as a printer according to this embodiment, the sharpness of the image lowers due to, for example, lowering of the sharpness of the image caused by a printing medium or ink bleeding or resolution conversion processing of magnifying the input image data into the printing medium size (print size). In another output apparatus such as a display or a projector as well, the sharpness of the image lowers in the output image.

Such a change of the sharpness of the input image caused by the output characteristic of the output apparatus is large in a tolerable in-focus area having a high sharpness (in focus) in the input, and small in an intolerable in-focus area having a low sharpness (having a blur) in the input. That is, in one image, the change amount of the sharpness changes between the areas. For this reason, the relationship of sharpness between the tolerable in-focus area and the intolerable in-focus area, which influences the three-dimensional appearance in the input image, is not directly maintained in the output image.

This will be described in more detail with reference to the graphs of FIGS. 7A to 7G. Referring to FIGS. 7A to 7G, for the sake of simplicity of the explanation, an image in which the spatial frequency characteristic of an image in an in-focus area and the spatial frequency characteristic of an image corresponding to a specific defocus amount included in an out-of-focus area have peaks at the same frequency will be handled. Additionally, in this embodiment, the characteristic obtained when the image is output after enlargement processing of magnifying the image to the printing medium size is performed for the image is defined as the output characteristic. In this embodiment, the relationship of sharpness between the tolerable in-focus area and the intolerable in-focus area will be described using the enlargement processing as an example of the resolution conversion processing. However, the resolution conversion processing may be equal magnification processing or reduction processing.

FIGS. 7A to 7G show the relationship between the contrast and the spatial frequency characteristic of an image. The ordinate represents the contrast, and the abscissa represents the spatial frequency characteristic [cycle/degree]. Additionally, in this specification, expressions "high frequency", "medium frequency", and "low frequency" will sometimes be used for the descriptive convenience. These represent relative relationships but not specific bands. However, these bands may be defined in accordance with the characteristic of a human eye or the like, and processing may be performed.

FIG. 7A shows an input characteristic 701 (solid line) and an output characteristic 702 (broken line) of an in-focus area 503. Similarly, FIG. 7B shows an input characteristic 703 (solid line) and an output characteristic 704 (broken line) of an out-of-focus area 504 with a specific defocus amount. FIG. 7C shows the input characteristic 701 (solid line) in FIG. 7A and the input characteristic 703 (broken line) in FIG. 7B in the same graph. Similarly, FIG. 7D shows the output characteristic 702 (solid line) in FIG. 7A and the output characteristic 704 (broken line) in FIG. 7B in the same graph.

In input image data having a three-dimensional appearance caused by a blur, a contrast value C1 representing the sharpness of the in-focus area 503 of the input image data at a specific spatial frequency and a contrast value C2 representing the sharpness of the out-of-focus area 504 hold a relationship 710 shown in FIG. 7C. When this input image is output by the output apparatus 102, the contrast values C1 and C2 change to C1' and C2', respectively, as shown in FIG. 7D.

As is apparent from FIGS. 7C and 7D, the change amount of the sharpness of the input image data changes between the in-focus area 503 and the out-of-focus area 504 by the output characteristic of the output apparatus 102. For this reason, the difference of the sharpness (a relationship 711 between the contrast values C1' and C2') that influences the three-dimensional appearance is smaller than the difference of the sharpness (the relationship 710 between the contrast values C1 and C2) in the input image data, and an appropriate three-dimensional appearance cannot be obtained in the output image. That is, to obtain an output image having the same three-dimensional appearance as the input image, the sharpness needs to be appropriately controlled based on the state of the blur of the image corresponding to the above-described defocus amount and the output characteristic of the output apparatus that influences the sharpness. In other words, control needs to be performed based on the output characteristic such that the difference of the sharpness (the relationship between the contrasts) is maintained or becomes close to the state of the input image.

FIG. 7E shows the output characteristic 702 (solid line) of the in-focus area in FIG. 7A and a characteristic 705 (broken line) as the result of controlling the sharpness of the image using the relationship between the defocus amount and the three-dimensional appearance control amount based on the output characteristic of the output apparatus. Similarly, FIG. 7F shows the output characteristic 704 (solid line) in FIG. 7B and a characteristic 706 (broken line) as the result of controlling the sharpness of the image using the relationship between the defocus amount and the three-dimensional appearance control amount based on the output characteristic of the output apparatus. In addition, FIG. 7G shows the characteristic 705 (solid line) in FIG. 7E and the characteristic 706 (broken line) in FIG. 7G in the same graph. Performing control such that the output image obtains a sharpness that is the same as or similar to that of the input image will be referred to as "recover" or "restore" here.

In the output image whose sharpness is appropriately controlled, the relationship between the contrast value of the in-focus area 503 and that of the out-of-focus area 504 is a relationship 716, as shown in FIG. 7G. In FIG. 7G, C1" is the contrast value of the in-focus area 503, and C2" is the contrast value of the out-of-focus area 504. As shown in FIG. 7G, in the output image for which the three-dimensional appearance control processing is executed based on the image output condition according to this embodiment, the difference of the sharpness that influences the three-dimensional appearance of the image has a value represented by the relationship 716 between the contrast values C1" and C2". On the other hand, in a case in which the processing according to this embodiment is not applied, the difference of the sharpness has a value represented by the relationship 711 between the contrast values C1' and C2', as shown in FIG. 7D. That is, in the output image for which the three-dimensional appearance control processing is executed based on the image output condition according to this embodiment, the difference of the sharpness (relationship 716) that influences the three-dimensional appearance of the image is larger than the difference of the sharpness (relationship 711) in a case in which the processing is not performed. Accordingly, since the difference of the sharpness is close to that (the relationship 710 between the contrast values C1 and C2) in the input image, in this embodiment, an appropriate three-dimensional appearance close to that of the input image can be obtained in the output image as well.

In this embodiment, as is apparent from the comparison between FIGS. 7A and 7E, in the in-focus area 503, the sharpness is controlled and recovered from a low frequency band to a high frequency band (a frequency band 712 shown in FIG. 7E). That is, in the in-focus area 503, the output characteristic 702 is controlled to be similar to or the same as the input characteristic 701, and thus set to the characteristic 705 within the range of the frequency band 712. This is because in the in-focus area that is in focus, a human eye perceives the in-focus state by confirming even a very fine texture as a feature.

On the other hand, as is apparent from the comparison between FIGS. 7B and 7F, in the out-of-focus area 504, the band is limited (a frequency band 714 shown in FIG. 7F) in accordance with the defocus amount such that the high frequency band is not included, and the sharpness is then recovered. That is, in the out-of-focus area 504, the output characteristic 704 is controlled to be similar to or the same as the input characteristic 703, and thus set to the characteristic 706 within the range of the frequency band 714. In a blurred portion (with a large defocus amount), recovery of the portion from the low frequency band to the medium frequency band is important. In addition, since the above-described high frequency band is a region including a noise component that is noticeable in a captured image, the noise component is also enhanced when the sharpness is recovered. For this reason, the range as the target of recovery is set to the range from the low frequency to the medium frequency. In this way, when control is performed in consideration of the visual characteristic of a human not to recover the noise component (high frequency band) that is the factor of image quality degradation, it is possible to obtain an appropriate three-dimensional appearance and output a high-quality image to the output apparatus. Note that the upper limit value of the frequency band 714 on the high frequency side may be defined in advance based on the vision of a human. Alternatively, in the output characteristic of the output apparatus 102, the spatial frequency at which the value of the contrast becomes a predetermined value (for example, 0) may be set to the upper limit value of the frequency band 714 on the high frequency side.

Additionally, depending on the output apparatus, the sharpness may be recovered by applying the band limitation to a part of the low frequency side, like a frequency band 713 shown in FIG. 7E or a frequency band 715 shown in FIG. 7F. This is because the degradation on the low frequency side is absent (almost absent) or invisible in the output apparatus such as a printer. In a case of recovering the sharpness by filter processing to be described later, when recovering the area on the low frequency side, the filter size becomes large, resulting in a decrease in the processing speed. For this reason, when the band on the low frequency side is limited, the decrease in the processing speed can be suppressed. The range of the area on the low frequency side limited here may be defined in advance based on, for example, the vision of a human. In addition, as the band on the low frequency side to be limited, the range for the in-focus area shown in FIG. 7E and the range for the out-of-focus area shown in FIG. 7F may be set to different ranges. The invisible degradation is preferably 0.2 as the value of an MTF characteristic to be described later.

Although not illustrated, in the above-described recovery control, the frequency band is preferably limited such that the frequency band gradually becomes narrower not to include a high frequency as the defocus amount becomes large. Additionally, since a tolerable in-focus area 505 is an area that looks in focus, the sharpness may be controlled and recovered in entire band from the low frequency to the high frequency where the sharpness needs to be corrected. In an intolerable in-focus area 506, the sharpness may be recovered in the limited band.

Note that in FIGS. 7A to 7G, for the sake of simplicity of the explanation, the contrasts at two points of the spatial frequency of the image in the in-focus area and the spatial frequency of the image corresponding to a specific defocus amount included in the out-of-focus area are compared. However, the above-described relationship also holds for the image of the in-focus area and an image corresponding to another defocus amount of the out-of-focus area. In addition, the above-described relationship also holds at two points of the spatial frequency of the image corresponding to a specific defocus amount included in the tolerable in-focus area and the spatial frequency of the image corresponding to a specific defocus amount included in the intolerable in-focus area.

In addition, the contrast value has been exemplified as the image characteristic that influences the sharpness of the image. However, it is self-evident that as for the change of the sharpness of the image in the in-focus area and the out-of-focus area by the output characteristic of the output apparatus, the same relationship can be described even for the spatial frequency characteristic representing the sharpness.

[Three-Dimensional Appearance Control Processing]

Three-dimensional appearance control processing according to this embodiment will be described below. The three-dimensional appearance control unit 401 controls the sharpness of input image data by sharpness control parameters set in the image processing condition 403. In the image processing condition 403, a three-dimensional appearance control amount for each defocus amount is set.

FIGS. 8A to 8D show the relationship between a defocus amount and a three-dimensional appearance control amount set in the image processing condition 403. In FIGS. 8A to 8D, the ordinate represents the three-dimensional appearance control amount, and the abscissa represents the defocus amount. The defocus amount in FIGS. 8A to 8D corresponds to that shown in FIG. 5B. An image processing condition creation method will be described later.

The three-dimensional appearance control unit 401 performs, for the brightness information of each pixel of input image data, sharpness processing by applying the three-dimensional appearance control amount set in the image processing condition 403 while referring to the defocus amount of the defocus map of the processing target pixel. In the imaging plane position, for example, a Laplacian Of Gaussian filter (equation (4)) or an unsharp mask is used.

$$h(x, y) = \frac{x^2 + y^2 - 2\sigma^2}{2\pi\sigma^2} \exp\left[-\frac{x^2 + y^2}{2\sigma^2}\right] \quad (4)$$

where σ is a filter parameter concerning the three-dimensional appearance control amount, and a value corresponding to a defocus amount is set. As σ, a parameter may be set in advance by an LUT (Look-Up Table) method, or may be calculated using a relational expression for the defocus amount. x and y represent the coordinates of a pixel in the x and y directions, and the coordinates are defined in advance.

Equation (5) is a transformation of the brightness information of input image data when the Laplacian Of Gaussian filter given by equation (4) is used. Out(x,y) as image data after three-dimensional appearance control processing is given by:

$$\text{Out}(x,y) = I(x,y) - \beta \times h(x,y) \times I(x,y) \quad (5)$$

where I(x,y) represents input image data and β is the three-dimensional appearance control amount for the defocus amount, which is set in the image processing condition 403.

Note that as the filter used for the sharpness processing, not only the above-described Laplacian Of Gaussian filter but also a method of adjusting the strength of a specific filter by the sharpness control amount can be used. The specific filter is, for example, a filter created by obtaining the reverse characteristic of the sharpness lowering information of the output apparatus.

In addition, it is important to limit the band in accordance with the defocus amount, as described above. Any filter is usable as long as the sharpness can be corrected by limiting the band. For example, the sharpness may be controlled by limiting the band by the above-described Laplacian Of Gaussian filter or the like. Alternatively, a band limitation filter may be created from the reverse characteristic of the sharpness lowering information.

In FIGS. 8A to 8D, β=β1 when defocus amount d=0 represents the control amount for the in-focus area of the input image. In FIGS. 8A to 8D, β1 represents the maximum three-dimensional appearance control amount. In addition, a defocus amount d1 is the value at the boundary between the tolerable in-focus area 505 and the intolerable in-focus area 506 shown in FIG. 5B. That is, d1 represents the upper limit value included in the tolerable in-focus area 505. Furthermore, a defocus amount d2 represents the maximum defocus amount included in the defocus map. Hence, the defocus amount takes a value within the range of d0 (=0) to d2. In addition, the three-dimensional appearance control amount takes a value within the range of β1 to 0.

Figure 8A:
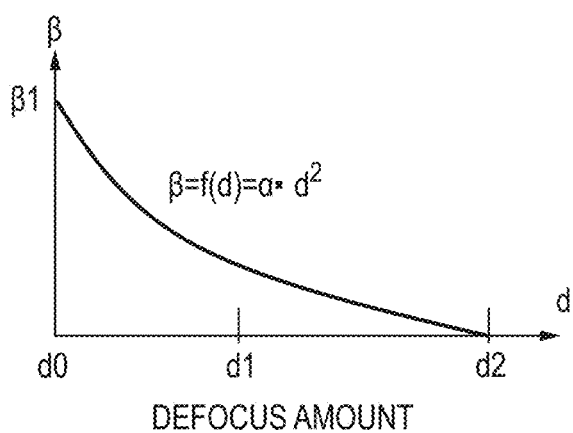
FIGS. 8A to 8D are views for explaining the relationship between a defocus amount and a three-dimensional appearance control amount according to the present invention.
Figure 8B:
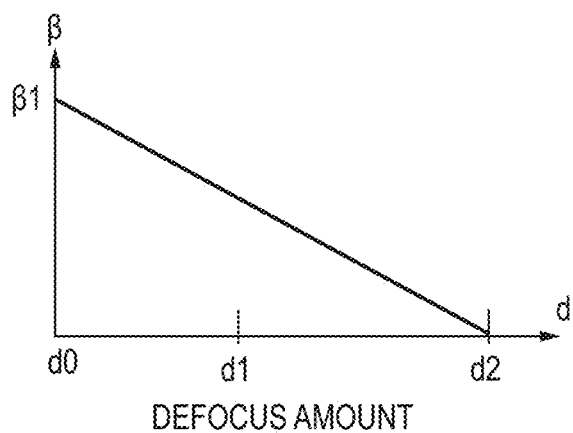
Figure 8C:
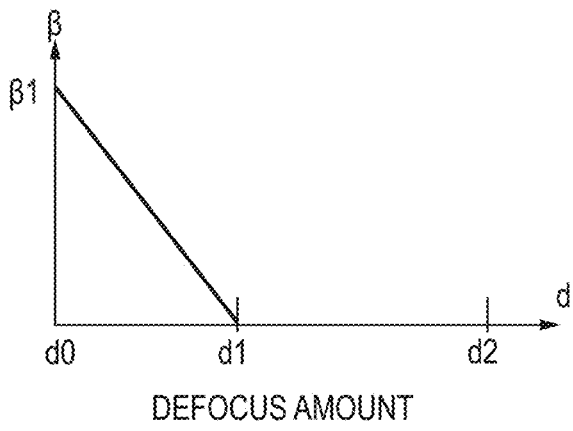

To obtain, in the output image, an appropriate three-dimensional appearance considering the output characteristic of the output apparatus, the image processing condition is set such that the three-dimensional appearance control amount for a pixel in the in-focus area 503 of the input image is maximized, as shown in FIGS. 8A to 8C. That is, the image processing condition is set such that the three-dimensional appearance control amount β1 for the defocus amount d0 is maximized. Furthermore, the control amount in the out-of-focus area 504 is preferably set to be smaller, that is, monotonously decrease as the defocus amount increases (becomes close to d2). If a defocus amount def is a value corresponding to the blur amount of the image as information corresponding to the distance from an in-focus plane 201, the defocus amount and the three-dimensional appearance control amount have a nonlinear relationship, as shown in FIG. 8A. The line shown in FIG. 8A is represented by β=f(d)=α·d2, where α is a conversion coefficient. The expression of the curve is merely an example, and another expression may be used. If the defocus amount corresponds to an image shift amount 206, the defocus amount and the three-dimensional appearance control amount have a linear relationship, as shown in FIG. 8B.

Additionally, as shown in FIG. 8C, the three-dimensional appearance control amount β may be set to "0" for the intolerable in-focus area 506 (the range of d1 to d2). In this case as well, the difference of the sharpness between the tolerable in-focus area 505 and the intolerable in-focus area 506 becomes close to the difference of the sharpness between the tolerable in-focus area 505 and the intolerable in-focus area 506 in the input image, and the three-dimensional appearance of the output image can be obtained, as described above. Additionally, FIG. 8C shows an example in which a position at which the three-dimensional appearance control amount β is "0" is the boundary between the tolerable in-focus area 505 and the intolerable in-focus area 506. However, in the output apparatus such as a printer, for example, the three-dimensional appearance control amount β may be set to "0" based on the position of the defocus amount at which the difference between the input characteristic and the output characteristic is a visually negligible difference, as shown in FIGS. 7A to 7G.

Figure 9A:
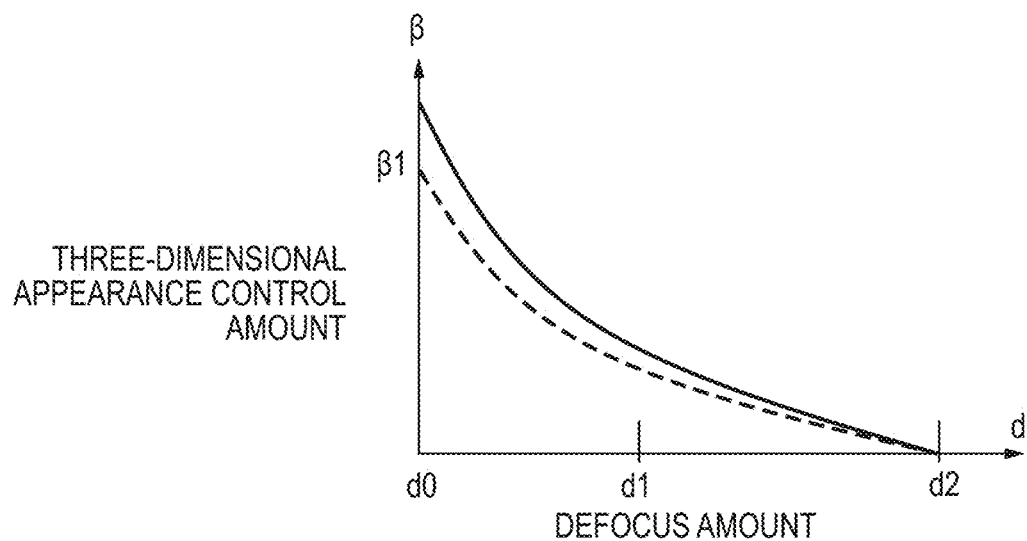
FIGS. 9A and 9B are views for explaining a variation in the three-dimensional appearance control amount for printing according to the present invention.
Figure 9B:
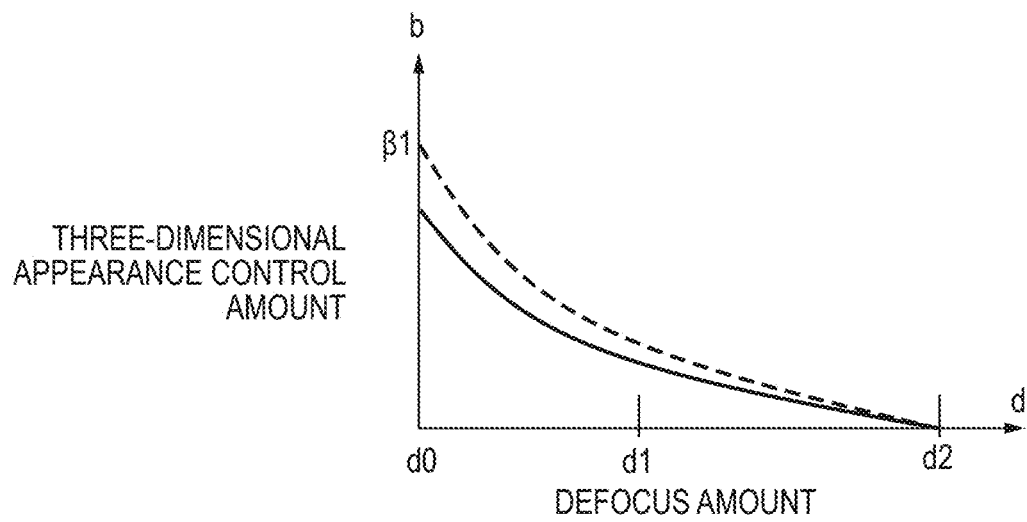

The above-described three-dimensional appearance control amount changes depending on the characteristic of the printing medium, the characteristic of ink (printing material), the printing medium size, and the like, as shown in FIGS. 9A and 9B. This is because the degree of lowering of the sharpness of the image caused by ink bleeding or the like changes depending on the printing medium or the ink characteristic, and the magnification ratio of resolution conversion processing changes depending on the printing medium size.

FIGS. 9A and 9B are views showing an example in which the three-dimensional appearance control amount is changed in accordance with the above-described characteristic of the printing medium or the like. The solid line in each of FIGS. 9A and 9B represents the three-dimensional appearance control amount for the defocus amount when an image is output under a condition different from that in FIG. 8A. The broken line in each of FIGS. 9A and 9B corresponds to the solid line in FIG. 8A. For example, FIG. 9A shows a case in which the three-dimensional appearance control amount is large because of large ink bleeding or a large magnification ratio as compared to FIG. 8A. To the contrary, FIG. 9B shows a case in which the three-dimensional appearance control amount is small because of small ink bleeding or a small magnification ratio as compared to FIG. 8A.

Figure 8D:
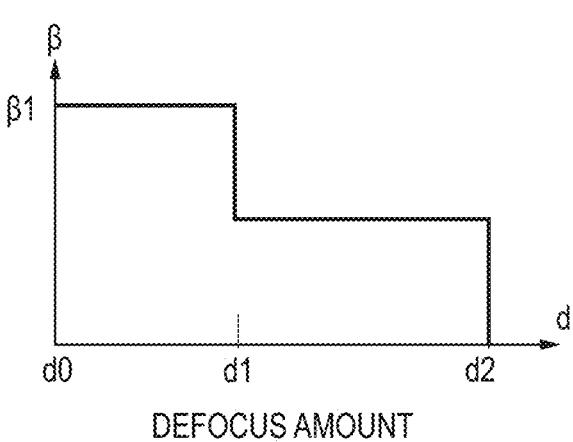

In addition, the sharpness processing has been described above as the processing of controlling sharpness. However, this may be contrast processing. More specifically, as shown in FIG. 8D, brightness conversion is performed such that the contrast of the brightness value of each pixel of the input image data in the tolerable in-focus area 505 (the range of d0 to d1) including the in-focus area 503 becomes high. As the brightness conversion, a method using a transformation using the three-dimensional appearance control amount as a coefficient or a method of making the contrast high by equalizing the histogram generated from the brightness value of each pixel of the input image data as described above can be used. However, the method is not limited to these, as a matter of course, as long as the contrast can be controlled.

Since both the sharpness processing and the contrast processing can control the sharpness of the output image, one of the processes may be selected in accordance with the characteristic of the image output apparatus, or the two processes may be used in combination.

[Image Processing Condition]

Figure 10:
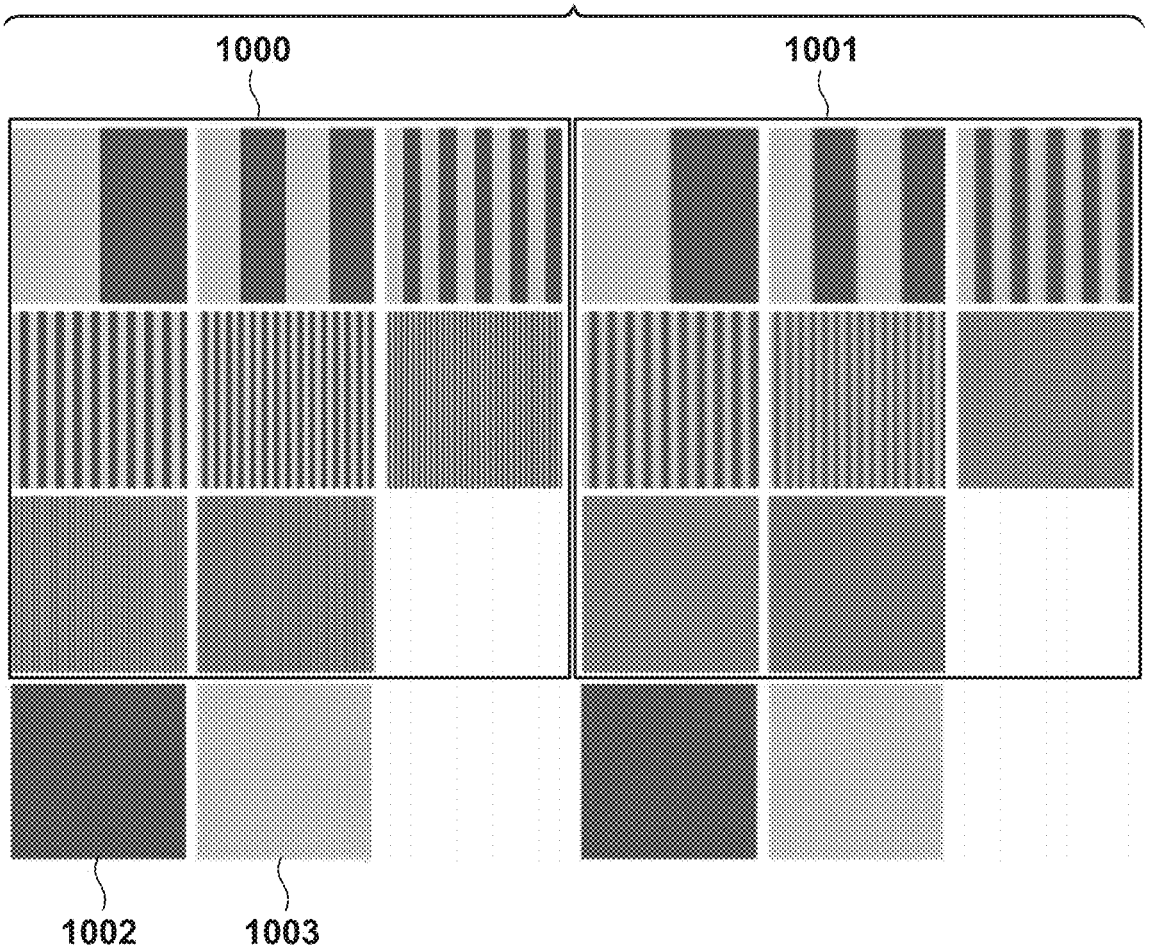
FIG. 10 is a view showing examples of patterns used when generating an image processing condition according to the present invention.

A method of creating the image processing condition 403 in the three-dimensional appearance control processing will be described. The image processing condition according to this embodiment corresponds to the conversion method as shown in FIGS. 8A to 8D, and is set based on the output characteristic of the output apparatus. As for a parameter to be set in the image processing condition 403, for example, a measurement image shown in FIG. 10 is output by the output apparatus 102 such as a printer, a display, or a projector, and the parameter is calculated from the frequency characteristic (MTF characteristic) of the output image by the output apparatus 102, which is obtained using a measurement apparatus (not shown). Note that a method of calculating the MTF characteristic of the output apparatus 102 from an image obtained by simulating, on the PC 101, each image processing in output image generation may be used. That is, in this embodiment, the three-dimensional appearance control amount β varies in accordance with the output characteristic of the output apparatus and the value of distance information.

The image shown in FIG. 10 includes an image group 1000 corresponding to the in-focus plane 201 that is in focus, and an image group 1001 expressed by a blur corresponding to the blur amount of the input image for a certain defocus amount. More specifically, the image shown in FIG. 10 is a chart including a plurality of patterns 1002 and 1003 such as a plurality of rectangular patterns, sine wave patterns, or even patterns of different frequencies. Note that the image shown in FIG. 10 includes a plurality of sine wave patterns of different frequencies. An even pattern is formed by a maximum pixel value and a minimum pixel value on the sine wave pattern.

The method of creating the image processing condition will be described with reference to the flowchart of FIG. 11. The processing procedure is executed by the cooperation of the output apparatus 102 and an information processing apparatus such as the PC 101. Note that the timing of creating the image processing condition is not particularly limited. The creation of the image processing condition may be executed in advance before the shipment of the output apparatus 102, and the generated information may be held in a condition holding unit 406 of the output apparatus 102 or may be updated as needed. In addition, when executing the processing, a measurement apparatus (not shown) for measuring the output result of the output apparatus 102 is used.

In step S201, the output apparatus 102 outputs the measurement image as shown in FIG. 10.

In step S202, the measurement apparatus (not shown) measures the measurement image output from the output apparatus 102, and obtains information necessary for MTF characteristic calculation. The necessary information here changes depending on the MTF characteristic calculation method.

In step S203, the information processing apparatus (not shown) calculates the MTF characteristic using information obtained by the measurement apparatus (not shown). For example, when the measurement image is a sine wave pattern, the MTF characteristic can be calculated by equations (6) to (8) or equation (9). The value of MTF shown in the following equations means the absolute value of an optical transfer function. If the average brightness of the output image changes, equation (9) is preferably used.

$$MTF(u) = \frac{C(u)}{C'} \quad (6)$$

$$C(u) = \frac{\text{Max}(u) - \text{Min}(u)}{\text{Max}(u) + \text{Min}(u)} \quad (7)$$

$$C' = \frac{R_1 - R_2}{R_1 + R_2} \quad (8)$$

$$MTF(u) = \frac{\text{Max}(u) - \text{Min}(u)}{R_1 - R_2} \quad (9)$$

where u is the frequency of a sine wave, Max(u) is the maximum reflectance of the sine wave pattern, which changes depending on the frequency, Min(u) is the minimum reflectance of the sine wave pattern, which changes depending on the frequency, and R1 and R2 are the reflectances of an even pattern (R1>R2).

In equation (6) or (9), reflectances are used as the values of R1 and R2. Instead, brightness values, densities, or device RGB values may be used. As the measurement apparatus (not shown), when the output apparatus 102 is a printer, for example, a scanner, a digital camera, or a microscope can be used. When the output apparatus 102 is a display or a projector, a digital camera can be used.

Additionally, if the measurement apparatus is a rectangular wave pattern, the MTF characteristic of the output apparatus 102 is expressed by a contrast transfer function (CTF) obtained by applying equation (6) or (9). Alternatively, an MTF value obtained by converting a CTF value by the Coltman's correction formula may be used.

By the above-described method, the frequency characteristic (MTF characteristic) of each of the images of the image group 1000 corresponding to the in-focus plane 201 included in the measurement image and the image group 1001 corresponding to an arbitrary defocus amount is obtained. FIG. 12 shows an example of the frequency characteristic. In FIG. 12, the ordinate represents the MTF characteristic, and the abscissa represents the spatial frequency [cycle/degree]. Additionally, in FIG. 12, the solid line (D0) indicates the frequency characteristic of the image group 1000 corresponding to the in-focus plane 201. The dotted line (D1) indicates the frequency characteristic of the image group 1001 corresponding to defocus amount d1 included in the tolerable in-focus area 505. The broken line (D2) indicates the frequency characteristic of the image group 1001 corresponding to defocus amount d2 included in the intolerable in-focus area 506.

Accordingly, the MTF characteristic can be obtained for each defocus amount. That is, an output characteristic of the output apparatus 102 concerning the sharpness can be obtained for each defocus amount.

In step S204, the information processing apparatus (not shown) calculates the three-dimensional appearance control amount to restore the sharpness or frequency characteristic of the in-focus area of the output image by sharpness processing to the sharpness or frequency characteristic of the input image.

To obtain, in the output image, the same appropriate three-dimensional appearance as that in the input image, the difference of the sharpness between the tolerable in-focus area and the intolerable in-focus area in the output image in a case in which the three-dimensional appearance control processing is applied needs to be close to the difference of the sharpness in the input image data, as compared to a case in which the processing is not applied. That is, to appropriately control the difference of the sharpness between the tolerable in-focus area and the intolerable in-focus area in the output image, the three-dimensional appearance control amount is controlled in accordance with the output characteristic of the output apparatus 102 which influences the sharpness for each defocus amount. In this embodiment, the three-dimensional appearance control amount is set to restore the sharpness or frequency characteristic of the in-focus area of the output image at a specific frequency by sharpness processing to the sharpness or frequency characteristic of the input image. Similarly, in this embodiment, even for the out-of-focus area, the restoration amount is calculated, as the three-dimensional appearance control amount, from the MTF characteristic obtained for each defocus amount. The three-dimensional appearance control amounts corresponding to the defocus amounts as shown in FIGS. 8A to 8D is thus calculated.

As for the relationship between the defocus amount and the sharpness, a method of setting the relationship as a relational expression that inputs the defocus amount shown in FIGS. 8A to 8D and outputs the three-dimensional appearance control amount, a method of selecting parameters by the LUT method and setting the relationship, or the like is used. Note that the method is not limited to these, and any method can be used as long as the three-dimensional appearance control amount for a defocus amount can be calculated.

In addition, the three-dimensional appearance control amount is not limited to the value that restores the MTF characteristic. If the condition that the difference of the sharpness in a case in which sharpness processing according to the defocus amount and the sharpness control amount based on the output characteristic of the output apparatus 102 is performed becomes larger than the difference of the sharpness in a case in which the processing is not performed is satisfied, an appropriate three-dimensional appearance can be obtained in the output image.

Furthermore, when the control amount β1 on the in-focus plane 201 shown in FIGS. 8A to 8D is set to restore the MTF characteristic of the image to a specific value (for example, 0.8 to 1.2), an image in which the in-focus plane 201 in the output image has a preferable sharpness can be obtained.

In this embodiment, the image processing condition has been described using, as an example, the relationship between the defocus amount and the three-dimensional appearance control amount. However, the present invention is not limited to this, and the relationship between the three-dimensional appearance control amount and the image shift amount 206 exemplified as information (distance information) corresponding to the distance from the in-focus plane 201 or the distance 304 between the in-focus plane and the object may be used as the image processing condition.

In step S205, the information processing apparatus (not shown) sets, based on the three-dimensional appearance control amount calculated in step S204, the image processing condition 403 derived from the output characteristic of the output apparatus concerning the sharpness according to the defocus amount. The processing procedure thus ends. When the input image data is processed using the image processing condition 403, the three-dimensional appearance of the output image can be controlled.

As described above, according to this embodiment, it is possible to obtain an appropriate three-dimensional appearance and output a high-quality image to the output apparatus.

In the above-described embodiment, as shown in FIG. 5B, an example in which the band of the spatial frequency to which image processing is applied is switched using two areas, that is, the tolerable in-focus area 505 handled as an area in focus and the intolerable in-focus area 506 other than that in the defocus map has been described. However, the present invention is not limited to this, and, for example, the intolerable in-focus area may be divided into a plurality of areas, and the band of the spatial frequency to which image processing is applied may be switched for each of the divided areas.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-128569, filed Jul. 5, 2018, which is hereby incorporated by reference herein in its entirety.

What is claimed is:

1. An image processing apparatus comprising:
an obtaining unit configured to obtain an image and distance information concerning a distance from an in-focus plane, which corresponds to each pixel included in the image;
a setting unit configured to set an image processing condition according to the distance information based on an output characteristic of an output apparatus concerning a sharpness; and
a processing unit configured to perform image processing for the image using the distance information obtained by the obtaining unit and the image processing condition set by the setting unit,
wherein the processing unit changes, in accordance with the distance information, a band of a spatial frequency of the image to which the image processing is applied.

2. The apparatus according to claim 1, wherein in a case in which the distance information indicates a first value, the processing unit widens the band of the spatial frequency to which the image processing is applied as compared to a case in which the distance information indicates a second value larger than the first value.

3. The apparatus according to claim 2, wherein
the first value is a value within a range up to a predetermined distance from the in-focus plane,
the second value is a value larger than the predetermined distance, and
the predetermined distance is an upper limit value of the distance from the in-focus plane, which is allowed to be in focus.

4. The apparatus according to claim 1, wherein in a case in which the distance information indicates a value larger than a predetermined value, the processing unit does not apply the image processing to a band higher than a first frequency of the image and applies the image processing to a band not higher than the first frequency of the image, and the predetermined value, and in a case in which the distance information indicates a value not larger than the predetermined value, the processing unit applies the image processing to a band higher than the first frequency of the image.

5. The apparatus according to claim 1, wherein the processing unit does not apply the image processing to a band of the spatial frequency lower than a predetermined frequency of the image and applies the image processing to a band of the spatial frequency not lower than a predetermined frequency of the image.

6. The apparatus according to claim 1, the band higher than the first frequency is a high frequency band in an entire frequency band.

7. An image processing apparatus comprising:
an obtaining unit configured to obtain an image and distance information concerning a distance from an in-focus plane, which corresponds to each pixel included in the image;
a setting unit configured to set an image processing condition according to the distance information based on an output characteristic of an output apparatus concerning a sharpness; and
a processing unit configured to perform image processing for the image using the distance information obtained by the obtaining unit and the image processing condition set by the setting unit,
wherein in a case in which the distance information indicates a value larger than a predetermined value, the processing unit does not apply the image processing to a band higher than a first frequency of the image and in a case in which the distance information indicates a value not larger than the predetermined value, the processing unit applies the image processing to a band higher than the first frequency of the image.

8. The apparatus according to claim 7, wherein the predetermined value is an upper limit value of the distance from the in-focus plane, which is allowed to be in focus.

9. The apparatus according to claim 7, wherein
in the band of a spatial frequency lower than a second frequency, the processing unit does not apply the image processing to the image, and
the second frequency is a frequency that is lower than the first frequency and falls within a range in which degradation is substantially absent, which is defined based on the output characteristic of the output apparatus concerning the sharpness and a vision of a human.

10. The apparatus according to claim 1, wherein the image processing is processing of controlling the sharpness of the image by performing one of contrast processing and sharpness processing.

11. The apparatus according to claim 10, wherein the image processing condition is a control amount according to the distance information in one of the contrast processing and the sharpness processing.

12. The apparatus according to claim 1, wherein the distance information is one of defocus information, an image shift amount, and information representing a distance from the in-focus plane to an object.

13. An image processing method comprising:
obtaining an image and distance information concerning a distance from an in-focus plane, which corresponds to each pixel included in the image;
setting an image processing condition according to the distance information based on an output characteristic of an output apparatus concerning a sharpness; and
performing image processing for the image using the obtained distance information and the set image processing condition,
wherein in the image processing, a band of a spatial frequency of the image to which the image processing is applied is changed in accordance with the distance information.

14. An image processing method comprising:
obtaining an image and distance information concerning a distance from an in-focus plane, which corresponds to each pixel included in the image;
setting an image processing condition according to the distance information based on an output characteristic of an output apparatus concerning a sharpness; and
performing image processing for the image using the obtained distance information and the set image processing condition,
wherein in the image processing, in a case in which the distance information indicates a value larger than a predetermined value, the image processing is not applied to a band higher than a first frequency of the image and in a case in which the distance information indicates a value not larger than the predetermined value, the image processing is applied to a band higher than the first frequency of the image.

15. A non-transitory computer-readable storage medium storing a program configured to cause a computer to execute:
obtaining an image and distance information concerning a distance from an in-focus plane, which corresponds to each pixel included in the image;

setting an image processing condition according to the distance information based on an output characteristic of an output apparatus concerning a sharpness; and performing image processing for the image using the obtained distance information and the set image processing condition, wherein in the image processing, a band of a spatial frequency of the image to which the image processing is applied is changed in accordance with the distance information.

16. A non-transitory computer-readable storage medium storing a program configured to cause a computer to execute:

obtaining an image and distance information concerning a distance from an in-focus plane, which corresponds to each pixel included in the image;

setting an image processing condition according to the distance information based on an output characteristic of an output apparatus concerning a sharpness; and performing image processing for the image using the obtained distance information and the set image processing condition, wherein in the image processing, in a case in which the distance information indicates a value larger than a predetermined value, the image processing is not applied to a band higher than a first frequency of the image and in a case in which the distance information indicates a value not larger than the predetermined value, the image processing is applied to a band higher than the first frequency of the image.

* * * * *